United States Patent
Chadha et al.

(10) Patent No.: US 11,679,689 B2
(45) Date of Patent: Jun. 20, 2023

(54) ELECTRIC VEHICLE CHARGING SUPPORT SYSTEM

(71) Applicant: Cummins Inc., Columbus, IN (US)

(72) Inventors: Parul Chadha, Columbus, IN (US); Mark A. Molewyk, Cambridge, MA (US); Fa Wang, Portland, OR (US); Cameron Halstead, Columbus, IN (US); Ana Guerrero de la Pena, Columbus, IN (US); Vivek A. Sujan, Columbus, IN (US); David A. Venable, Columbus, IN (US)

(73) Assignee: CUMMINS INC., Columbus, IN (US)

( * ) Notice: Subject to any disclaimer, the term of this patent is extended or adjusted under 35 U.S.C. 154(b) by 328 days.

(21) Appl. No.: 16/918,467

(22) Filed: Jul. 1, 2020

(65) Prior Publication Data
US 2022/0001763 A1   Jan. 6, 2022

(51) Int. Cl.
*B60L 53/62*   (2019.01)
*B60L 53/66*   (2019.01)
*B60L 58/12*   (2019.01)

(52) U.S. Cl.
CPC .............. *B60L 53/62* (2019.02); *B60L 53/66* (2019.02); *B60L 58/12* (2019.02); *B60L 2240/54* (2013.01)

(58) Field of Classification Search
CPC .......... B60L 53/62; B60L 53/66; B60L 58/12; B60L 2240/54; B60L 53/67; Y02T 10/70; Y02T 10/7072; Y02T 90/12; Y02T 90/16
See application file for complete search history.

(56) References Cited

U.S. PATENT DOCUMENTS

| | | | |
|---|---|---|---|
| 6,850,898 B1 | 2/2005 | Murakami | |
| 9,505,318 B2 | 11/2016 | Hendrix | |
| 10,099,569 B2 | 10/2018 | Lindemann | |
| 10,424,131 B2 | 9/2019 | Kutkut | |
| 2010/0211340 A1 | 8/2010 | Lowenthal | |
| 2012/0133337 A1 | 5/2012 | Rombouts | |
| 2012/0330494 A1 | 12/2012 | Hendrix | |
| 2014/0039709 A1* | 2/2014 | Steven | G06Q 10/06 700/291 |
| 2018/0238698 A1* | 8/2018 | Pedersen | G05D 1/0088 |
| 2020/0376972 A1* | 12/2020 | Martin | H01M 10/44 |

* cited by examiner

*Primary Examiner* — Richard M Camby
(74) *Attorney, Agent, or Firm* — Faegre Drinker Biddle & Reath LLP

(57) ABSTRACT

A method for operating one or more processors to control access of a plurality of pieces of rechargeable electrical equipment, optionally including one or more electric vehicles, to one or more charging resources. An access queue is maintained for each of the charging resources. Each piece of equipment is assigned a position in an access queue when it is determined to have a state of charge (SOC) less than the first level. Each access queue is updated based on charger information such as its availability. A piece of equipment is assigned access to a charging resource when its queue position reaches a first priority position and a charging resource is available. For each piece of equipment assigned access to a charging resource, an instruction to end access to the charging resource is issued when an elapsed charging time period is equal to or greater than a break time or the SOC is greater than a second level representative of an operational charge.

20 Claims, 9 Drawing Sheets

ELECTRIC VEHICLE CHARGING SUPPORT SYSTEM

FIELD

This disclosure relates generally to electric equipment charging. Embodiments include a system for controlling the charging of a fleet of vehicles to optimize utilization of the vehicles and available charging resources.

BACKGROUND

Rechargeable power sources such as batteries and fuel cells are used to power fixed location electric equipment and mobile equipment such as electric vehicles. It may be advantageous for these items or pieces of equipment to be powered by power sources that provide sufficient power capacity for the equipment to complete their missions, for example, task(s), shift(s), or day(s) or work, without being recharged. The power sources may then be recharged between missions. However, attributes of the equipment missions and/or the power sources make this approach inefficient in certain applications. For example, the weight and costs associated with the use of rechargeable power sources generally increase with increasing power storage capacity of the sources.

Because of constraints imposed by factors of these types, battery powered pieces of equipment can be configured to be recharged during their missions. Known approaches for recharging power sources of pieces of equipment during the missions include first in-first out approaches. For example, when a piece of equipment temporarily discontinues active operations in connection with its mission, such as for example during a break, it may wait at the end of a line of one or more other pieces of equipment waiting for access to the charging resources, and get access to the charging resources only after the other pieces of equipment ahead of it in the line have completed their use of the charging resources. Once connected to a charging resource, the piece of equipment may end its charging operation after the battery is fully charged. Approaches such as these, however, are inefficient. For example, the equipment may make inefficient use of the charging resources, and may fail to be sufficiently robust to meet the equipment demands such as those based on day-to-day variations such as the operation, duty cycle intensity and delays associated with the equipment.

There remains, therefore, a continuing need for enhanced systems for controlling the recharging of vehicles and other electric powered equipment. Such a system that optimizes the use of available charging resources for a fleet of vehicles and/or charging resources available to the vehicles would be especially desirable.

SUMMARY

This disclosure addresses certain electric vehicle and other equipment charging system inefficiencies by utilizing an intelligent charging strategy for a plurality of such vehicles and/or equipment in an ecosystem environment. Vehicle and/or other equipment uptime and ecosystem costs related to the batteries and/or other rechargeable power sources and/or charging resources can be optimized. For example, in a closed ecosystem such as a warehouse yard or ship port, repetitive natures of the electric equipment may be exploited, along with information of the other agents in the ecosystem, to determine the appropriate charging strategy for the equipment. Vehicles operating in such closed ecosystems may be subject to relatively long periods of mission-related activity that may be followed by periods of rest (e.g., where traditional plug in charging may be performed). However, there may also be one or more breaks or other pauses during the mission work cycle, for example operator breaks, waiting for a supporting vehicle or other equipment to perform or complete a mission, or waiting in a line or queue. These break periods may be considered opportunities for charging. By using these break periods for charging opportunities in accordance with the disclosures herein, the amount of energy that might otherwise be needed to be carried on-board the equipment can be reduced. The overall need to charge all of the vehicles at the same time during breaks may be reduced, as charging may be done as a function of equipment missions. Enhanced level charge demand from the power grid may be maintained, thereby reducing associated peak demand charges. The equipment may be able to effectively complete missions using relatively smaller batteries, thereby reducing the costs of the batteries themselves, and increasing the payload capacity and utilization of the equipment.

Embodiments include a method for operating one or more processors to control access of a plurality of pieces of rechargeable electrical equipment, optionally including one or more electric vehicles, to one or more charging resources. In embodiments, the method includes receiving equipment information associated with each of the plurality of pieces of equipment, wherein the equipment information includes state-of-charge (SOC) and break time; receiving charger information associated with each of the one or more charging resources, wherein the charger information includes availability; maintaining an access queue for each of the one or more charging resources; determining for each piece of equipment when the SOC is less than a first level representative of a low charge; assigning each piece of equipment determined to have a SOC less than the first level a queue position in an access queue; updating each access queue based on the charger information, optionally the availability; assigning a piece of equipment access to a charging resource when the queue position of the piece of equipment reaches a first priority position and a charging resource is available; determining, for each piece of equipment assigned access to a charging resource, an elapsed charging time period and the SOC; and generating, for each piece of equipment assigned access to a charging resource, an instruction to end access to the charging resource when the elapsed charging time period is equal to or greater than the break time or the SOC is greater than a second level representative of an operational charge.

Examples include a method for operating one or more processors to control access of a plurality of pieces of rechargeable electrical equipment, optionally including one or more electric vehicles, to one or more charging resources. Embodiments of the method comprise: receiving equipment information associated with each of the plurality of pieces of equipment, wherein the equipment information includes state-of-charge (SOC) and break time; receiving charger information associated with each of the one or more charging resources, wherein the charger information includes availability; maintaining an access queue for each of the one or more charging resources; determining for each piece of equipment when the SOC is less than a first level representative of a low charge; assigning each piece of equipment determined to have a SOC less than the first level a queue position in an access queue; updating each access queue based on the charger information, optionally the availability;

assigning a piece of equipment access to a charging resource when the queue position of the piece of equipment reaches a first priority position and a charging resource is available; determining, for each piece of equipment assigned access to a charging resource, an elapsed charging time period and the SOC; and generating, for each piece of equipment assigned access to a charging resource, an instruction to end access to the charging resource when the elapsed charging time period is equal to or greater than the break time or the SOC is greater than a second level representative of an operational charge.

In embodiments, assigning a queue position may include initially assigning the piece of equipment a last priority position. Updating the access queue may include updating the access queue on a first in-first out basis based on availability of the charging resource. Updating the access queue may include updating the access queue on a first in-first out basis based on availability of the charging resource.

In embodiments, maintaining an access queue comprises maintaining an access queue including a plurality of priority groups; and assigning a queue position includes assigning a position in one of the plurality of priority groups based on the equipment information. At least some of the plurality of priority groups of the access queue may include a different sequence ordering approach. Assigning a queue position may include assigning a position based on one or more of the SOC, break time, or charging rate of the charging resource. Examples may further comprise reordering the queue positions in each of the plurality of priority groups.

In embodiments, receiving equipment information includes receiving a battery charging capability parameter; and the method further includes: determining, for each piece of equipment assigned access to a charging resource, if the battery is at a low charging capability state based on the battery charging capability parameter; and generating, for each piece of equipment assigned access to a charging resource, an instruction to end access to the charging resource when the battery is determined to be at the low capability charging state and one or more other of the pieces of equipment include assigned access queue positions. Embodiments include assigning an access queue position to each piece of equipment for which an instruction to end access to the charging resource was generated when the battery is determined to be at the low capability charging state. Assigning the access queue position may include assigning the piece of equipment a last priority position.

Embodiments may include reordering queue positions of the pieces of equipment in the access queue. Reordering queue positions may include reordering the queue positions based on one or both of the vehicle information or the charging resource information. Reordering queue positions may include reordering the queue positions based on one or more of SOC, break time, or charging rate of the charging resource.

In embodiments, the method further comprises determining, for each piece of equipment assigned a charging resource, a predicted amount of charge for the piece of equipment to complete its mission; and generating an instruction to end access to the charging resource when the SOC is greater than the second level includes generating the instruction to end the access to the charging resource when the SOC is greater than the predicted amount of charge. Assigning the access queue position may include assigning the access queue position based on the predicted amount of charge.

In embodiments, the method further comprises determining, for each piece of equipment assigned a charging resource, a predicted amount of charge for the piece of equipment to complete its mission; and assigning the access queue position includes assigning the access queue position based on the predicted amount of charge.

Assigning a piece of equipment access to a charging resource may include assigning the piece of equipment to a charging resource based on one or more of the vehicle information and the charging resource information. Assigning the piece of equipment access to a charging resource may include assigning the piece of equipment to a charging resource based on the SOC of the piece of equipment and charging rate of the charging resource.

In some embodiments, the method is used in a closed vehicle and charging resource ecosystem.

DETAILED DESCRIPTION

Figure 1:
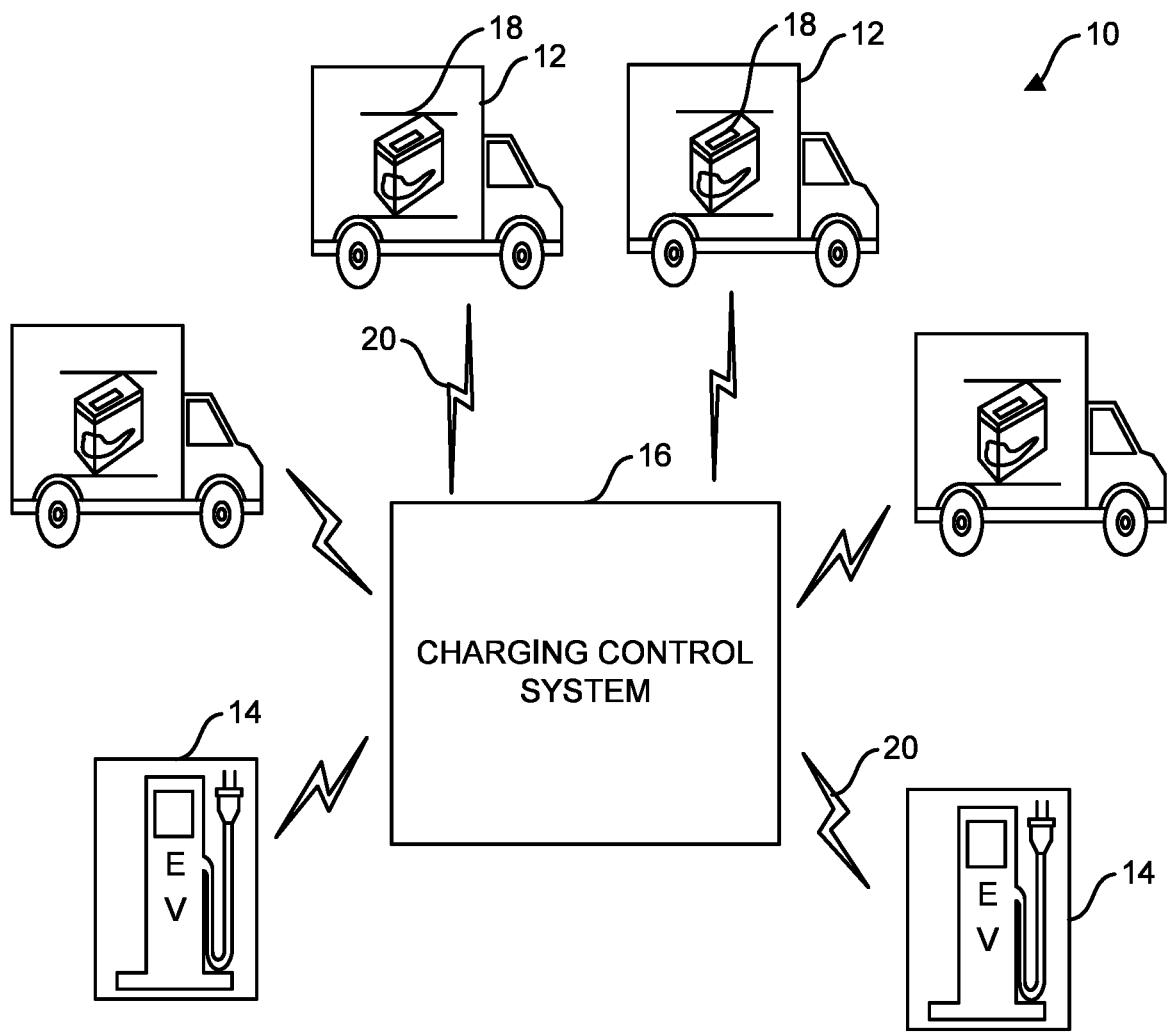
FIG. 1 is a diagrammatic illustration of an electrical equipment charging support system in accordance with embodiments.

FIG. 1 is a diagrammatic illustration of a an electrical vehicle and/or other equipment charging support system 10 in accordance with embodiments. The illustrated embodiments include a plurality of pieces of rechargeable electrical equipment such as electric vehicles (EV) 12, one or more electrical charging resources 14 (e.g. charging stations), and a charging control system 16. Each piece of electric equipment such as vehicles 12 includes a rechargeable power source such as a rechargeable battery 18 that can be recharged (e.g., by an electrical connection to one or more of the charging resources 14). The charging control system 16 communicates with the electric vehicles 12 and/or charging resources 14 by communication channels 20. As described in greater detail below, control system 16 allocates the charging resources 14 to the electric vehicles 12 in a manner that optimizes the ability of the individual vehicles and/or a group of two or more of the vehicles to complete their missions with minimal or no productivity loss from the primary mission expectations or objects due to being temporarily out service during recharging events (e.g., maximize vehicle uptime). In addition to the advantages of mission optimization, the system 10 can provide other advantages. For example, fewer or less expensive charging resources 14 and/or smaller or less expensive batteries 18 may enable reduced infrastructure costs. Smaller and/or lighter batteries 18 may also enhance vehicle payloads and thereby increase mission capacities.

System 10 can, for example, be used in an ecosystem including a fleet of vehicles 12. Examples of such embodiments include fleets of vehicles 12 operated by one or more entities providing warehouse yard, ship port or transit services. In other embodiments the system 10 is used with open ecosystems of vehicles 12 operated by more than one and different entities such as individual transportation service providers. Ecosystems of these types may have a defined group of one or more charging resources 14 available to the vehicles 12. Although described below in connection with electric vehicles 12 (i.e., mobile equipment), system 10 can be used in connection with other types of rechargeable electric equipment such as trucks, buses, construction equipment and agricultural equipment, including fixed location or non-mobile equipment such as overhead cranes and V2G equipment. In such embodiments, the charging resources 14 may be mobile or otherwise transported to the equipment allocated to the charging resources, and/or the batteries 18 of the equipment can be transported to the allocated charging resources. Wireless charging technologies can also be used. Examples include stationary wireless charging (e.g., equipment and charger are both stationary) and non-stationary charging (e.g., where the equipment is charged while it moves through a location). Charging may be performed using wireless charging strips in embodiments. Although described in connection with rechargeable batteries 18, the system 10 can be used in connection with equipment powered by other rechargeable electric power supplies, such as for example fuel cells.

Figure 2:
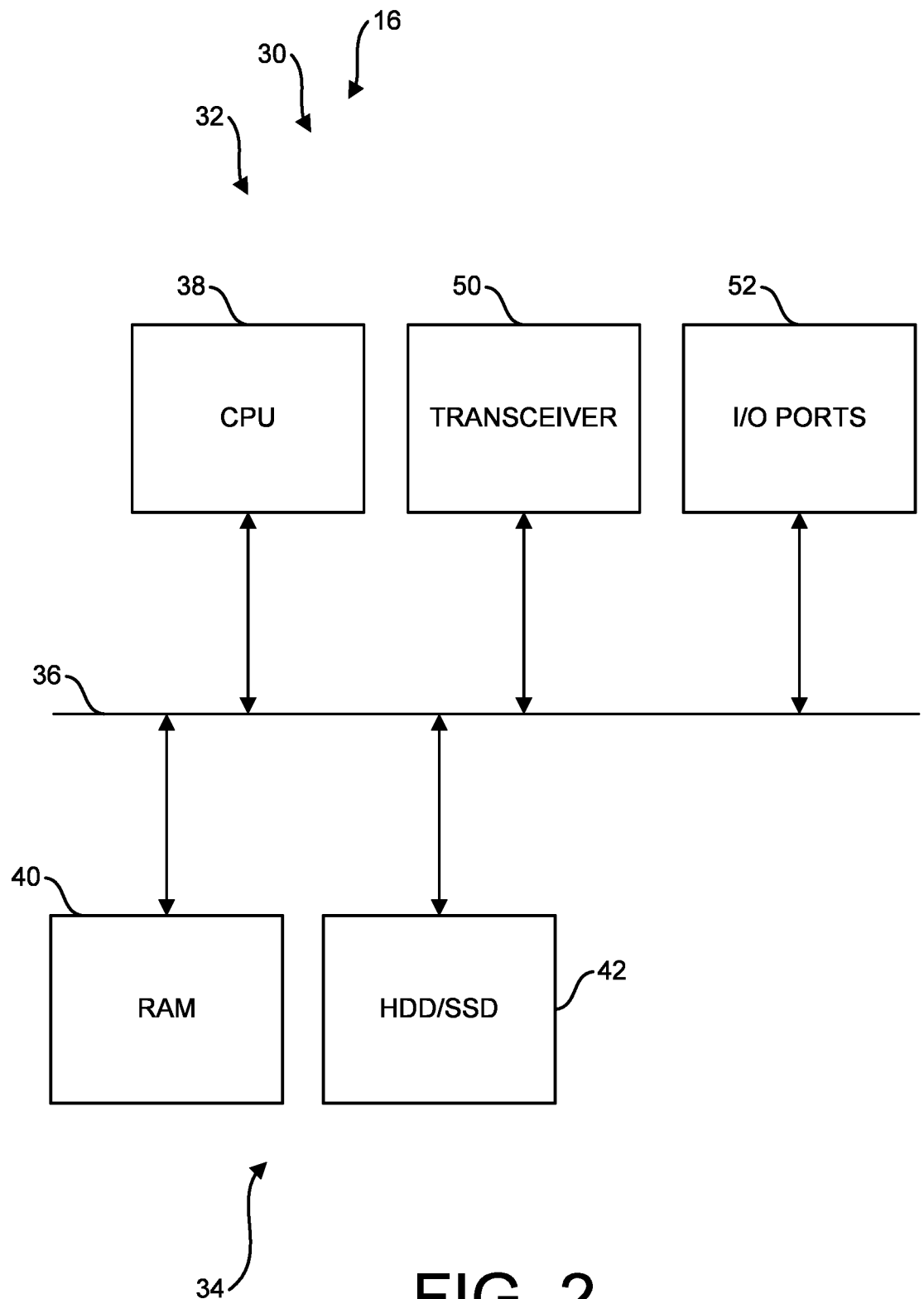
FIG. 2 is a diagrammatic illustration of a charging control system, in accordance with embodiments.

FIG. 2 is a diagrammatic illustration of exemplary functional components of the charging control system 16 in accordance with embodiments. The illustrated embodiments include a processing system 30 comprising processing components 32 and storage components 34 coupled by a bus 36. Processing components 32 may, for example, include one or more central processing units (CPUs) 38 providing the processing functionality of the charging control system 16. The storage components 34 may include RAM memory 40, hard disk drive (HDD) and/or solid state drive (SSD) memory 42, providing the information and other data storage functionality of the charging control system 16. For example, operating system and other software used by the processing components 32 to implement the charging resource allocation methods and algorithms of the system 10 as described herein may be stored in the storage components 34. Components of the processing system 30 can be implemented as programmed microprocessors, application specific integrated circuits (ASICs), controllers and/or discrete circuit components. Other embodiments of the processing system 30 are implemented using other conventional or otherwise known systems or devices.

Charging control system 16 also includes a transceiver 50 to provide communication functionality with the vehicles 12 and/or charging resources 14 via communication channels 20. In embodiments, system 10 may be configured to operate with any one or more suitable wired or wireless communication channels 20 such as for example WiFi, cellular, satellite, cable and/or optical channels. Communication channels 20 may also include one or more private or public networks such as local area networks and wide area networks (e.g., the Internet). Transceiver 50 interfaces the charging control system 16 to the communication channels 20, enabling the charging control system to receive information or other data from the vehicles 12 and/or charging resources 14, and/or to transmit information or other data to the vehicles and/or charging resources. Similarly, transceiver 50 can couple the charging control system 16 to other electronic systems (not shown) for information or other data communications. The embodiments illustrated in FIG. 2 also include input/output (I/O) ports 52 through which the charging control system 16 can receive and transmit information or other data. For example, in embodiments, the charging control system 16 may be coupled by input/output ports 52 to an enterprise data processing system of the entity operating an ecosystem including the vehicles 12 and/or charging resources 14 for purposes of receiving information or other data such as of the types described below in connection with the charging resource allocation functionality.

Figure 3:
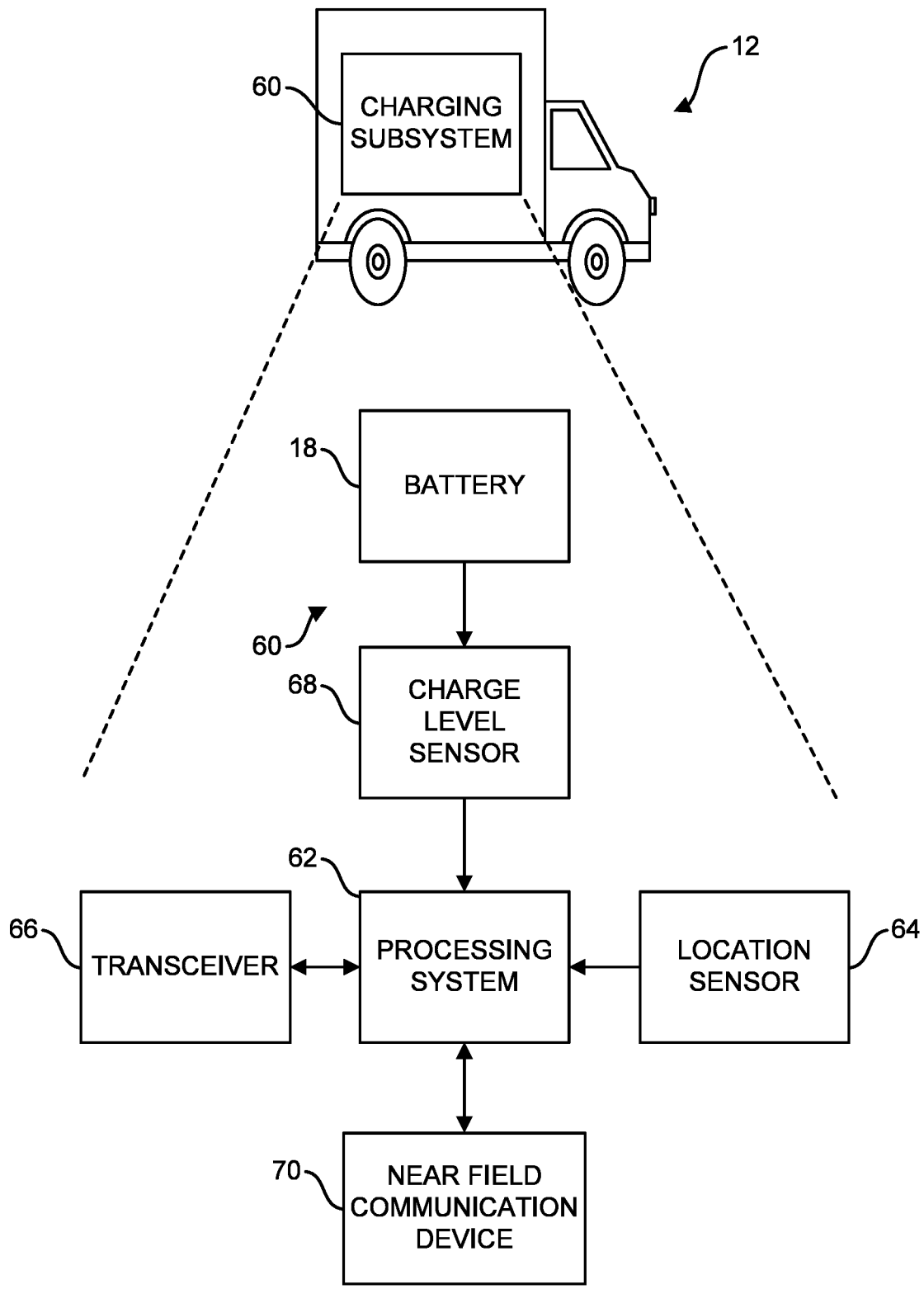
FIG. 3 is a diagrammatic illustration of a charging subsystem of a vehicle, in accordance with embodiments.

FIG. 3 is a diagrammatic illustration of exemplary functional components of a charging subsystem 60 of vehicles 12 in accordance with embodiments. In addition to the rechargeable battery 18, the illustrated embodiments of subsystem 60 include a processing system 62 coupled to a location sensor 64, transceiver 66 and/or charge level sensor 68. Processing system 62 may be embodied by components that are substantially the same as or similar to those of processing system 30 of the charging control system 16 described above in connection with FIG. 2. Location sensor 64 can be any suitable device for providing information about the location of the associated vehicle 12, and is a GPS receiver in embodiments. Other embodiments of the charging system 60 may not include a location sensor such as 64. For example, embodiments of system 10 may not make use of information about the location of one or more vehicles 12, and/or the locations of vehicles can be obtained by other approaches (e.g., through the charging resources 14). Transceiver 66 interfaces the charging subsystem 60 to the communication channels 20, enabling the charging subsystem to receive information and other data from the charging control system 16, charging resources 14 and/or other vehicles 12, and/or to transmit information and other data to the charging control system, charging resources and/or other vehicles. Transceiver 66 may be embodied by components that are substantially the same as or similar to those of the transceiver 50 of the charging control system 16 described above in connection with FIG. 2.

The charge level sensor 68 is coupled to receive information about the current state-of-charge (SOC) of the battery 18 (e.g., the remaining power or energy stored in the battery), and to couple that information to the processing system 62. As described in greater detail below, the charging subsystem 60 can transmit the SOC of the battery 18 to other components of the system 10, such as the charging control system 16, charging resources 14 and/or other vehicles 12 for use in connection with the provision of the charging resource allocation functionality. The illustrated embodiments of the charging subsystem 60 also include a near field communication device 70 configured to communicate or otherwise cooperate with charging resources 14 within a near field communication proximity of the vehicle 12 in which the charging subsystem 60 is located (e.g., direct communications via a path not including the charging control system 16 and/or communication channels 20). In embodiments, for example, the near field communication device 70 may be a Bluetooth or inductive transceiver. Optionally or in addition, the near field communication device 70 may include a bar code system (e.g. a bar code and/or a bar code reader on the vehicle 12). In yet other embodiments, the functionality of the near field communication device 70 can be provided by the transceiver 66.

Figure 4:
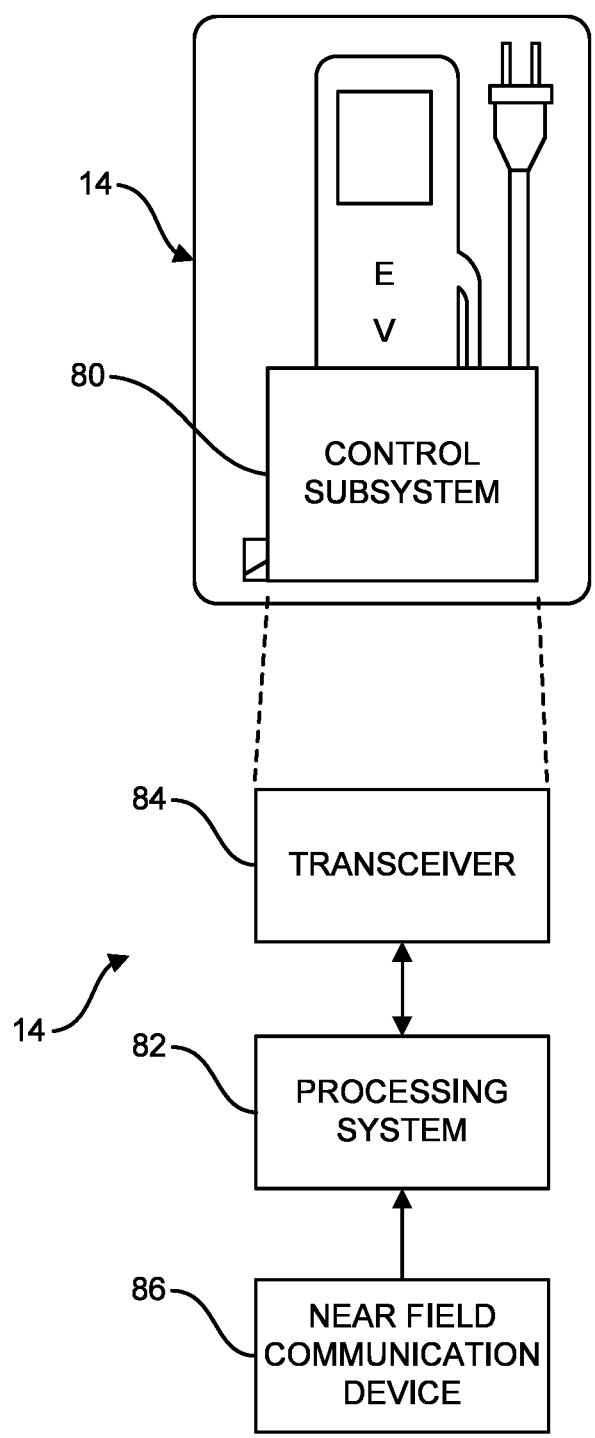
FIG. 4 is a diagrammatic illustration of a control subsystem of a charging resource, in accordance with embodiments.

FIG. 4 is a diagrammatic illustration of exemplary functional components of a control subsystem 80 of charging resources 14 in accordance with embodiments. As shown, the control subsystem 80 includes a processing system 82 coupled to a transceiver 84. Processing system 82 may be embodied by hardware components that are substantially the same as or similar to those of processing system 30 of the charging control system 16 described above in connection with FIG. 2. Transceiver 84 interfaces the control subsystem 80 to the communication channels 20, enabling the control subsystem to receive information and other data from the charging control system 16, vehicles 12 and/or control subsystems of other charging resources 14, and/or to transmit information and other data to the charging control system, vehicles and/or other control subsystems. Transceiver 84 may be embodied by components that are substantially the same as or similar to those of the transceiver 50 of the charging control system 16 described above in connection with FIG. 2. The illustrated embodiments of the control subsystem 80 also include a near field communication device 86 configured to communicate or otherwise cooperate with the charging subsystem 60 of vehicles 12 within a near field communication proximity of the charging resources 14 in which the control subsystem 80 is located. Near field communication device can be embodied by components that are substantially the same as or similar to those of the near field communication device 70 of the vehicle charging subsystem 60 described above in connection with FIG. 3. In yet other embodiments the functionality of the near field communication device 86 may be provided by the transceiver 84.

Figure 5A:
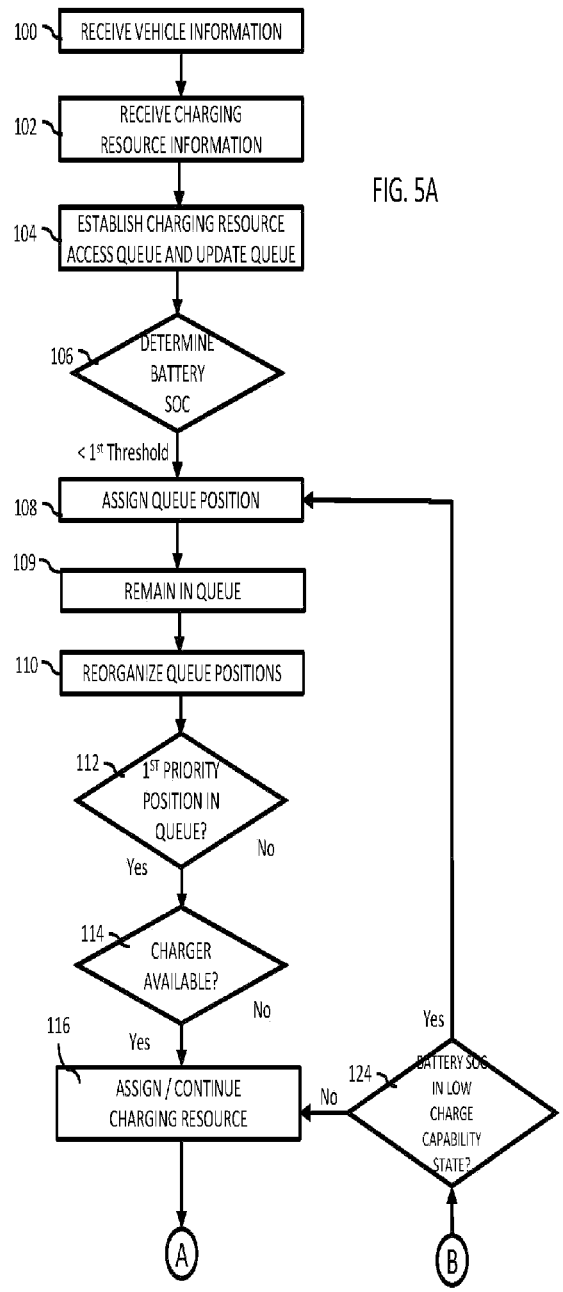
FIGS. 5A and 5B are diagrammatic illustrations of charging resource allocation methods in accordance with embodiments.
Figure 5B:
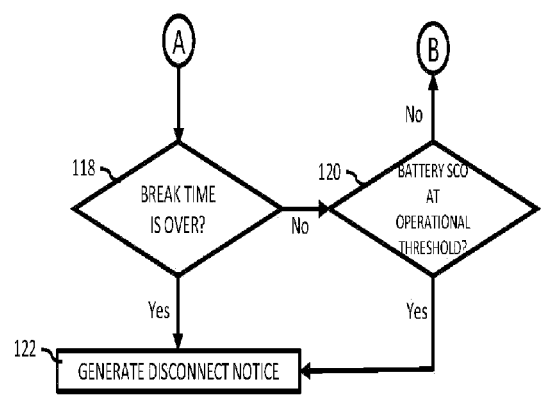

Methods by which the vehicles 12, charging resources 14 and/or charging control system 16 operate in accordance with embodiments are described with reference to FIGS. 5A-5B. In embodiments, charging control system 16 operates as a central management system. In such embodiments the charging control system 16 receives information and other data used in connection with the resource allocation method (e.g., the vehicle information and/or charging resource information described below) from other agents of the system such as the vehicles 12 and charging resources 14, provides the resource allocation decisioning described herein (e.g., establishes, maintains and reorganizes the access queue), and communicates information and other data (e.g., instructions assigning charging resources and/or to discontinue access to the charging resources) to the appropriate vehicles, charging resources and/or other agents. Other embodiments are configured as decentralized processing approaches. For example, by a decentralized processing approach each vehicle 12 may obtain portions or all information and other data used in connection with the resource allocation method from other agents in the system, such as other vehicles 12 and/or charging resources 14. Each vehicle 12 performs the resource allocation decisioning (e.g., by its charging subsystem 60 to determine whether and when it should connect to and/or disconnect from a charging resource 14), and communicates information and other data to the appropriate vehicles, charging resources and/or other agents. Yet other embodiments are configured as limited decentralized processing approaches. By such approaches, for example, each vehicle 12 may obtain information about the other vehicles and infer information about charging resources 14. For example, charging resource information such as availability may be inferred by vehicles 12 based on knowledge of what other vehicles are doing. Each vehicle 12 may perform local co-optimization resource allocation decisioning (e.g., by its charging subsystem 60 to determine whether and when it should connect to and/or disconnect from a charging resource 14), and communicates information and other data to the appropriate vehicles, charging resources and/or other agents.

As shown generally by step 100, the charging support system 10 (e.g., one or more processors of the charging control system 16, charging control subsystems 60 of vehicles 12 and/or control subsystems 80 of charging resources 14) make use of vehicle information in connection with the charging resource allocations. The vehicle information includes parameters or information about each of the vehicles 12, and may also include information about the collective fleet or plurality of the vehicles (i.e., in embodiments used in connection with closed ecosystems). The vehicle information may be received from the vehicles 12 associated with the information, from the charging resources 14, the charging control system 16 and/or from external agents or sources such as enterprise management systems (e.g., of the operator of the vehicles). The vehicle information can be stored by the storage components 34 of the charging control system 16, the charging subsystems 60 of one or more vehicles 12, the control subsystem 80 of one or more charging resources 14, and/or other data storage. Nonlimiting examples of the types of vehicle information include the following:

Vehicle and/or Battery ID
Battery Size (e.g., based on the vehicle mission)
Battery Current SOC
Battery Full SOC (e.g., the battery SOC when fully charged or charged to another operationally full level)
Battery Low SOC
Battery Charge Capability
Battery State of Health (SOH)
Vehicle Break Time
Full Mission Energy Needs
Length of Mission The vehicle and/or battery ID may be information identifying an associated vehicle 12 and/or associated battery 18. The vehicle battery size may be information about specifications or characteristics such as an operating voltage and/or total energy storage capacity. The battery size information may relate to the nature of the mission performed by the associated vehicle 12 and battery 18. For example, vehicles 12 used for missions characterized by relatively short time periods and/or relatively low total mission power capacity may be relatively small, whereas vehicles used over relatively longer time period missions and/or requiring relatively height total mission power capacity may be relatively large.

The current SOC of a battery 18 can, for example, be determined by the charge level sensor 68 of the associated vehicle 12. The vehicle battery full SOC information may define or characterize the maximum charge capacity of the battery 18. In embodiments, the full SOC information may be characterized in terms of the maximum rated or specified charge of the battery 18. In other embodiments the full SCO may be characterized as an operational full charge level that is less than the maximum charge capacity of the battery 18, but sufficient to enable the battery and associated vehicle to effectively perform their mission. For example, the operational full charge level may be a level less than the maximum charge capacity, but a level to which the battery can be efficiently charged (e.g., a maximum level within its linear charge state). The vehicle battery low SOC information may characterize a charge level of the battery 18 that is determined to be sufficiently low that it should be recharged. The battery low SOC may be a level that is based on one or more factors or parameters such as the nature of the mission of the associated vehicle. In embodiments, the battery low SOC may be characterized as a particular charge level, or as a percentage of the full SOC, for example. In yet other embodiments, the low battery SOC is a charge level that is determined to be sufficiently low that the vehicle 12 will be unable to complete its mission without charging.

Charging characteristics or capabilities for certain batteries 18 may include relatively nonlinear portions. For example, certain batteries may relatively quickly charge to a certain percentage or other threshold level or state (e.g., 80%) of their full SOC, but charge relatively slowly from that level to the full SOC. Embodiments of system 10 may make use of the charging capabilities of the battery 18 to optimize the usage of a group of vehicles 12 and/or charging resources 14. In embodiments, the battery charge capability information characterizes the charge capability (e.g., rate of charge) over a range of states. In other embodiments the battery charge capability is threshold level information characterizing a first or relatively high or linear charge capability state with respect to a second or relatively low or nonlinear charge capability state.

System 10 makes use of certain break times of the vehicle to optimize the usage of a group of vehicles 12 and/or charging resources 14. For example, vehicles 12 in closed ecosystems may operate during relatively long periods of activity that may be followed by periods of rest or inactivity during which traditional plug in charging may be applied. There are also break times during which the vehicles 12 are idle or otherwise inactive in the mission. For example, a vehicle 12 may periodically have to wait in a line, or wait for other vehicles to complete portions of their missions, before the vehicle can resume active operations of its mission. System 10 makes use of break periods to charge vehicles 12. In embodiments, the vehicle break times can be defined in time periods such as minutes. By using break times in accordance with methods described herein, the amount of energy that may be required to be carried on board the vehicles 12 may be substantially reduced. The overall need for charging of all vehicles 12 of a group of vehicles at the same time during breaks can thereby be reduced, since charging is done as a function of vehicle mission. This approach may also maintain a more level or steady charge demand from the power grid, reducing associated peak demand charges.

System 10 may also make use of certain information relating to the expected mission of the vehicle 10. For example, in embodiments described in greater detail below, system 10 makes certain determinations such as when to charge the vehicle 12, charging access queue position assignments and/or reorganizations and/or when to discontinue access to charging resources based on predicted amounts of energy the vehicle may need to complete its mission. In connection with the determination of such predicted charging needs, embodiments of system 10 may use mission information such as the length of time of the mission, the length of time or other information characterizing a portion of a mission that has been completed, the number of breaks that the vehicle may have available during a mission, battery state of health and/or the full mission energy needs of the vehicle to complete its mission.

As shown generally by step 102, the charging support system 10 makes use of information about the charging resources 14 in connection with its charging resource allocations. The charging resource information includes parameters or information about each of the charging resources 14. The charging information may be received from the charging resources 14 associated with the information, from the vehicles 12, the charging control system 16 and/or from external sources such as an enterprise management system. In embodiments, the charging resource information includes information about all of the charging resources 14 available to a vehicle 12. The charging resource information can be stored by the storage components 34 of the charging control system 16, the control subsystems 82 of the associated charging resources 14, the charging subsystem 60 of one or more vehicles 12 and/or other data storage. Nonlimiting examples of the types of charging resource information include the following:

Charging Resource Availability

Charging Resource Charging Specifications

Charging resource availability may be determined by the charging resources 14 and transmitted to other components of the system 10. In other embodiments vehicles 12 can determine charging system availability based on information received from other vehicles (e.g., their location in proximity to a charging resource). In yet other embodiments, the system 10 maintains records of the availability of charging resources 14 based on knowledge of its assignment of a charging resource to a vehicle 12 and/or its instructions to a vehicle to discontinue access to a charging resource. The charging specifications of a charging resource 14 may include information such charging rate or capacity.

As shown generally by step 104, the charging support system 10 establishes and maintains an access queue for each of the charging resources 14. The access queue may be a waiting line or list of one or more vehicles 12 that have been assigned access to the charging resource 14, but are waiting for the charging resource to become available (e.g., because the charging resource is being used by another vehicle). In embodiments, the access queue includes a sequence of positions. In such a sequence, a first priority position may be a position at or near a "top" of the list or sequence, entitling the associated vehicle 12 to the next available charging resource (e.g., after a vehicle using the charging resource is instructed to disconnect or leave the charging resource). A last priority position may be a position at or near a "bottom" of the list or sequence, entitling the associated vehicle to a charging resource after all the vehicles in the access queue with a higher priority position have been provided access to the charging resource.

As shown generally by step 106, the current SOC of each vehicle battery 18 is continually or periodically monitored to determine whether it is below a level, such as for example a first threshold such as the low SOC, indicating that the battery SOC is low. These SOC monitoring and determining operations can, for example, be performed by the charging subsystem 60 of the associated vehicle 12, and a message indicating the vehicle or battery ID and its need for a charge can be transmitted to the charging control system 16. In other embodiments, the charging subsystem 60 transmits the vehicle and/or battery ID and current SOC to another component of the system 10 such as for example the charging control system 16, and the charging control system makes the low SOC determination. In embodiments, the determination at step 106 is performed by comparing the current SOC to the low SOC of the battery 18 of the vehicle 12. In embodiments, the system 10 repeats the step 106 while the current SOC is greater than or equal to the low SOC. Other embodiments may use other methodologies and information for determining the need for a battery 18 to be charged. For example, in embodiments described below, the system 10 determines a need for a vehicle 12 to be charged when the current SOC is below a level predicted or otherwise determined be needed for the vehicle to complete a remaining portion of its mission.

Figure 6:
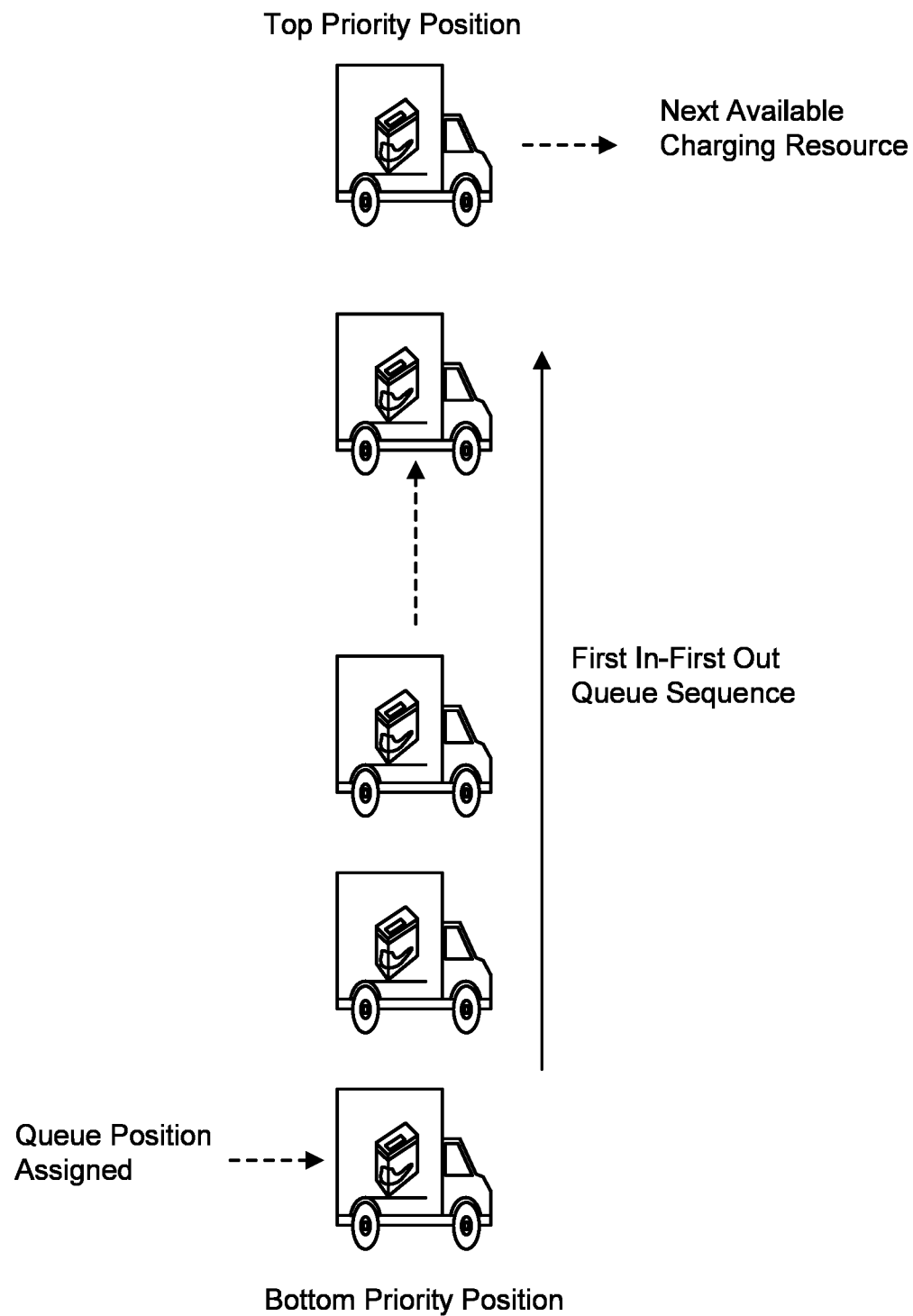
FIG. 6 is a diagrammatic illustration of an access queue for charging resources, in accordance with embodiments.

As shown generally by step 108, a vehicle 12 is assigned a position in an access queue when the system 10 determines that associated battery 18 is low on charge. In embodiments, the system 10 uses a first in-first out (FIFO) access queue sequence, and the vehicle 12 is initially assigned a low or lowest priority position at a bottom of the queue sequence. FIG. 6 is a diagrammatic illustration of a first in-first out access queue in accordance with embodiments. As shown, when the vehicle 12 is initially assigned a queue position, the assigned position may be at the bottom of the queue sequence. As charging resources 14 become available, the vehicle 12 at the top of the queue sequence is assigned to the available charging resource, and the queue positions of any vehicles in the queue are updated accordingly to increase the priority levels of their positions (e.g., step 104) as they remain in the queue (step 109). In other embodiments, system 10 may initially assign vehicles 12 queue positions based on one or more other factors. For example, at step 108 the queue positions may be assigned based on factors such as a mission priority level assigned to the vehicle 12 and/or SOC with respect to other vehicles in the access queue.

As shown generally by step 110, embodiments of the system 10 continually or periodically reorganize the positions assigned to vehicles 12 in the access queue. For example, the system 10 may reorganize the access queue positions when vehicles 12 are initially assigned a queue position (e.g., such as at step 108) and/or when vehicles are assigned a charging resource 14 and leave the queue (e.g., such as at step 116 described below). Any suitable methodologies can be used to reorganize the access queue, and examples of such methodologies are described below. By reorganizing queue sequences at step 110, system 10 can optimize the allocation of charging resources 14 and the abilities of one or more vehicles 12 to complete their missions. In other embodiments, system 10 does not reorganize the access queue positions after they have been assigned to vehicles 12. For example, in embodiments the system 10 uses a first in-first out queue methodology and does not periodically reorganize the queue access positions.

As shown generally by steps 112, 114 and 116, vehicles 12 are assigned access to one of the charging resources 14 when the access queue position of the vehicle reaches a top priority position and an appropriate charging resource is available. For example, in embodiments the system 10 monitors the access queue to determine when a vehicle 12 has reached priority position such as the top of the queue (e.g., step 112). If the vehicle 12 has not reached a priority position entitled to an available charging resource 14, the vehicle may remain in the queue (e.g., step 109). If the vehicle 12 has reached a priority position in the access queue entitling the vehicle to access a charging resource 14, the system 10 determines whether a charging resource is available to the vehicle (e.g., step 114). If a charging resource 14 is not available for the vehicle 12, it may remain in the queue (e.g., step 109).

As shown by step 116, if a charging resource 14 is available to a vehicle 12 with a top priority position, system 10 assigns the charging resource to the vehicle. The vehicle 12 may then connect or otherwise couple to the assigned charging resource 14 to begin the charging operation. The determination made in connection with step 116 may be based on factors in addition to availability of a charging resource 14 suitable for the vehicle 12. In embodiments, for example, there may be more than one suitable charging resource 14 available for a vehicle 12. The system 10 may select the charging resource 14 for the vehicle 12 based on criteria relating to one or more of the battery 18 and/or the charging resources. For example, if the state of health (SOH) of the battery 18 is at a certain state, such as a level that is below a predetermined threshold SOH level, system 10 may assign a charging resource 14 from a group of one or more charging resources that has characteristics that may enhance the SOH of the battery, such as a charging resource with a relatively slow charging capacity. Factors such as the location proximity of the charging resource 14 and vehicle 12 (e.g., which available charging resource is closest to the vehicle) and operating characteristics of the charging resource (e.g., which available charging resource has the highest charge rate) may be used. In embodiments, the system 10 may select the charging resource 14 to assign to the vehicle 12 based on other factors, such as for example the vehicle information of other vehicles 12 in the access queue and/or the current SOC of the vehicle.

In connection with the assignment of a charging resource 14, the system 10 may transmit a notice of the assignment. For example, the notice may be transmitted to the vehicle 12 and/or the charging resource 14. The notice may include an identification of the assigned charging resource 14 and/or information identifying the location of the charging resource and/or an identification of the vehicle 12 assigned to the charging resource (e.g., the vehicle ID). For example, if the determination is made by the charging control system 16, the charging control system may transmit a notice identifying the assigned charging resource 14 to the vehicle 12 and/or the charging resource 14 (e.g., by communication channels 20). Information about the assignment notice may be transmitted between the vehicle 12 and/or charging resource 14 as needed or otherwise appropriate (e.g. by the communication channels 20 and/or the near field communication devices 70 and 86 of the vehicle and charging resource, respectively). In other embodiments such as the distributed processing embodiments described above, the assignment of the charging resource 14 may be made by other components of the system 10 such as, for example, by the vehicle 12 to which the charging resource is assigned. In response to the receipt of the notice, the vehicle 12 and/or assigned charging resource 14 may take appropriate action to enable the vehicle to couple to the charging resource. In the illustrated embodiments including vehicles 12 (i.e., mobile equipment), the vehicles may be driven or otherwise transported to the location of the charging resource 14.

For each vehicle 12 assigned to a charging resource 14 (e.g., for each vehicle that is performing a charging operation at step 116), the system 10 monitors one or more parameters for use in connection with a determination of when to end or discontinue the charging operation. In the embodiments shown in FIGS. 5A and 5B, for example, the system 10 monitors the length of time or time period that the vehicle 12 has been assigned to the charging resource 14 (i.e., the elapsed charging time period), and monitors the current SOC of the associated battery 18. As shown by steps 118 and 122, if the length of time that the vehicle 12 has been assigned to the charging resource 14 is equal to or greater than a predetermined time period such as the break time of the vehicle, system 10 may make a determination to end the vehicle's access to the charging resource. As shown by steps 120 and 122, if by the charging operation the SOC of the vehicle battery 18 has reached a predetermined threshold such as a full SOC or an operational threshold, system 10 may make a determination to end the vehicle's access to the charging resource 14 (e.g., even if the vehicle break time is not over).

Other embodiments of system 10 make use of alternative or additional criteria in connection with the determination of ending access of a vehicle 12 to a charging resource 14. For example, in embodiments the system 10 may make a determination to discontinue the charging operation for a vehicle 12 if the current SOC is greater than a predetermined SOC that is less than the full SOC of the vehicle (e.g., SOC>80% full SOC), and/or attributes of the access queue such as an indication that there are one or more other vehicles that have been assigned queue positions (i.e., are waiting in line for access to a charging resource 14). Alternatively or in addition, system 10 may determine to end access of a vehicle 12 to a charging resource 14 based on the associated SOH of the battery 18. For example, if the SOH is below a predetermined threshold level, a decision may be made to end access of the vehicle 12 to the charging resource 14 when the SOC reaches a predetermined level less than the full SOC to help extend the life of the battery. Alternatively or in addition, system 10 may end access of the vehicle 12 to the charging resource 14 when the associated charging capability is below a predetermined level, such as a level representative of a transition between linear and nonlinear charging states (e.g., to prevent stressing cells of the battery). Alternatively or in addition, the system 10 may end access of the vehicle 12 to the charging resource 14 when the SOC has reached a level predicted or otherwise determined to be sufficient for the vehicle to complete its mission.

In response to a determination to end access of a vehicle 12 to a charging resource 14, the system 10 may generate a disconnect notice to the vehicle 12 and/or the charging resource 14 as shown by step 122. The notice may be in the form of an instruction to disconnect or otherwise uncouple from the charging resource 14. Similar to the notice of charging resource assignment, the system 10 may transmit a notice to disconnect to the vehicle 12 and/or the charging resource 14. For example, if the disconnect notice is generated by the charging control system 16, the charging control system may transmit the disconnect notice to the vehicle 12 and/or the charging resource 14 (e.g., by communication channels 20). Information about the disconnect notice may be transmitted between the vehicle 12 and/or charging resource 14 as needed or otherwise appropriate (e.g. by the communication channels 20 and/or the near field communication devices 70 and 86 of the vehicle and charging resource, respectively). In other embodiments such as the distributed processing embodiments described above, the disconnect notice may be generated by other components of the system 10 such as, for example, by the vehicle 12 to which the charging resource 14 is assigned. In response to the receipt of the notice, the vehicle 12 and/or assigned charging resource 14 may take appropriate action to enable the vehicle to uncouple from the charging resource. The recharged vehicle 12 may then return to the operation of its mission, and the charging resource 14 may be made available to another vehicle (e.g., the vehicle assigned to the top priority position in the access queue, per steps such as 112, 114 and 116 above). In embodiments, the system 10 updates the access queue (e.g., per step 104) each time a charging resource 14 becomes available.

In embodiments, if the parameters monitored by system 10 do not result in a determination to end access of a vehicle 12 to a charging resource 14, the system 10 may continue to perform the monitoring steps (e.g., repeating steps 118 and 120) until the criteria for ending access are met. In embodiments, the system 10 monitors one or more additional parameters in connection with the determination of ending access of a vehicle 12 to a charging resource 14. In the embodiments shown in FIGS. 5A and 5B, for example, if the system 10 determines that the criteria for ending access of a vehicle 12 to a charging resource 14 are not met (e.g., at steps 118 and 120), the system monitors parameters to determine whether to continue to provide the vehicle with access to the charging resource (e.g., whether to continue to provide the vehicle with access to the charging resource 14 (e.g., step 116), or to instruct the vehicle to take alternative action. As shown by step 124, for example, embodiments of system 10 condition the continuation of access of vehicle 12 to the charging resource 14 based on the charge capability state of the vehicle's battery 18. In embodiments of this type the system 10 may compare the current SOC of the battery 18 (e.g., which is still below the full or operational SOC) to the vehicle information characterizing the charge capability of the vehicle's battery 18. As shown, if the system 10 determines that the SOC of the battery 18 is in a high capability state, the system continues to provide the vehicle 12 with access to the charging resource 14 (e.g., step 116).

If the system 10 determines that the SOC of the battery 18 is in a low capability state by the determination of step 124 (e.g., is in a nonlinear charge state), the system may instruct the vehicle 12 to take action other than continuing to provide access to the charging resource 14. In the embodiments illustrated in FIGS. 5A and 5B, for example, system 10 issues a notice to the vehicle 12 and/or the charging resource 14 to discontinue the vehicle's access to the charging resource 14. The notice can be in the form of an instruction that is transmitted to the vehicle 12 and/or charging resource 14 in the manner described above, and the vehicle and/or charging resource may respond to the notice in the manner described above. In addition to discontinuing access of the vehicle 12 to the charging resource 14, the system 10 may assign a new queue position to the vehicle. For example, in the embodiments illustrated in FIGS. 5A and 5B, the system 10 assigns a queue position to the vehicle 12 by repeating the steps described above in connection with step 108. For example, the system 10 may assign the vehicle 12 a low priority access position when repeating step 108. In other embodiments, the system 10 may take other actions in response to a determination at step 124 that the current SOC of the battery 18 is in a low capability charge state. An overall objective may be to dispense as much energy as possible during given time periods to enhance the uptime of the vehicle fleet.

Figure 7:
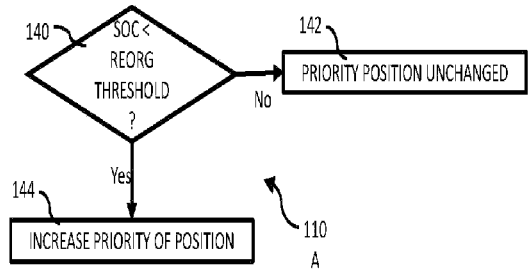
FIG. 7 is a diagrammatic illustration of charging resource allocation assignment and reorganization methods in accordance with embodiments.

As noted above, in embodiments the system 10 continuously or periodically reorganizes the access queue positions to enhance the optimization of the allocation of charging resources 14 (e.g., at step 110). FIG. 7 is a diagrammatic illustration of a reorganization method 110A that can be performed by system 10 in accordance with embodiments. As shown by step 140, the system 10 determines whether the current SOC of each of one or more vehicles 12 in the access queue is below a reorganization threshold level. For example, the reorganization threshold level can be based on the full or operational SOC level of the vehicle 12 (e.g., 30% of the full SOC). In embodiments, the reorganization threshold levels may be different for different vehicles 12. If the current SOC for each of the one or more vehicles 12 is determined not be below the reorganization threshold level, the assigned queue position for the associated vehicle is not changed (step 142). If the current SOC for each of the one or more vehicles 12 is greater than or equal to the reorganization threshold level, the assigned queue position for the associated vehicle may be changed, for example to a higher priority position (step 144).

Queue reorganizations performed at step 144 can make use of any suitable methodology. In embodiments, for example, the system 10 assigns vehicles 10 to the highest priority position. If more than one vehicle 12 is having its queue position reassigned at step 144, the priority positions can be assigned in a sequence corresponding to their current SOCs (e.g., with vehicles having the lowest SOC being assigned the highest priority positions). An objective of queue reorganization may be maximum uptime of a vehicle fleet.

Other embodiments of system 10 use other methodologies and/or criteria to reorganize the access queue positions at step 110. For example, in embodiments, system 10 determines a reorganization variable VAR that can be used to reorganize the access queue in a matter that may optimize the allocation of charging resources 14. Eq. 1 below is an example of a reorganization variable VAR.

$$VAR = \frac{\text{Break Time}}{\frac{(1 - SOC\ \%)*\text{Battery Size}}{\text{Charging Rate}}} \qquad \text{Eq. 1}$$

By Eq. 1., VAR is a number representative of the level of charge that a battery 18 can achieve by the charging resource 14 during the vehicle's break time. For example, if VAR=1, the break time of the vehicle 12 is long enough to enable the charging resource 14 to charge the vehicle's battery 18 to the full SOC.

Figure 8:
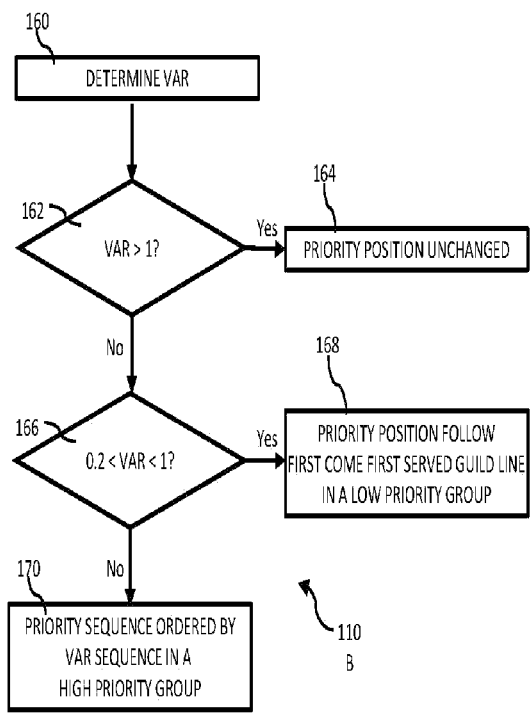
FIG. 8 is a diagrammatic illustration of charging resource allocation assignment and reorganization methods in accordance with embodiments.
Figure 9:
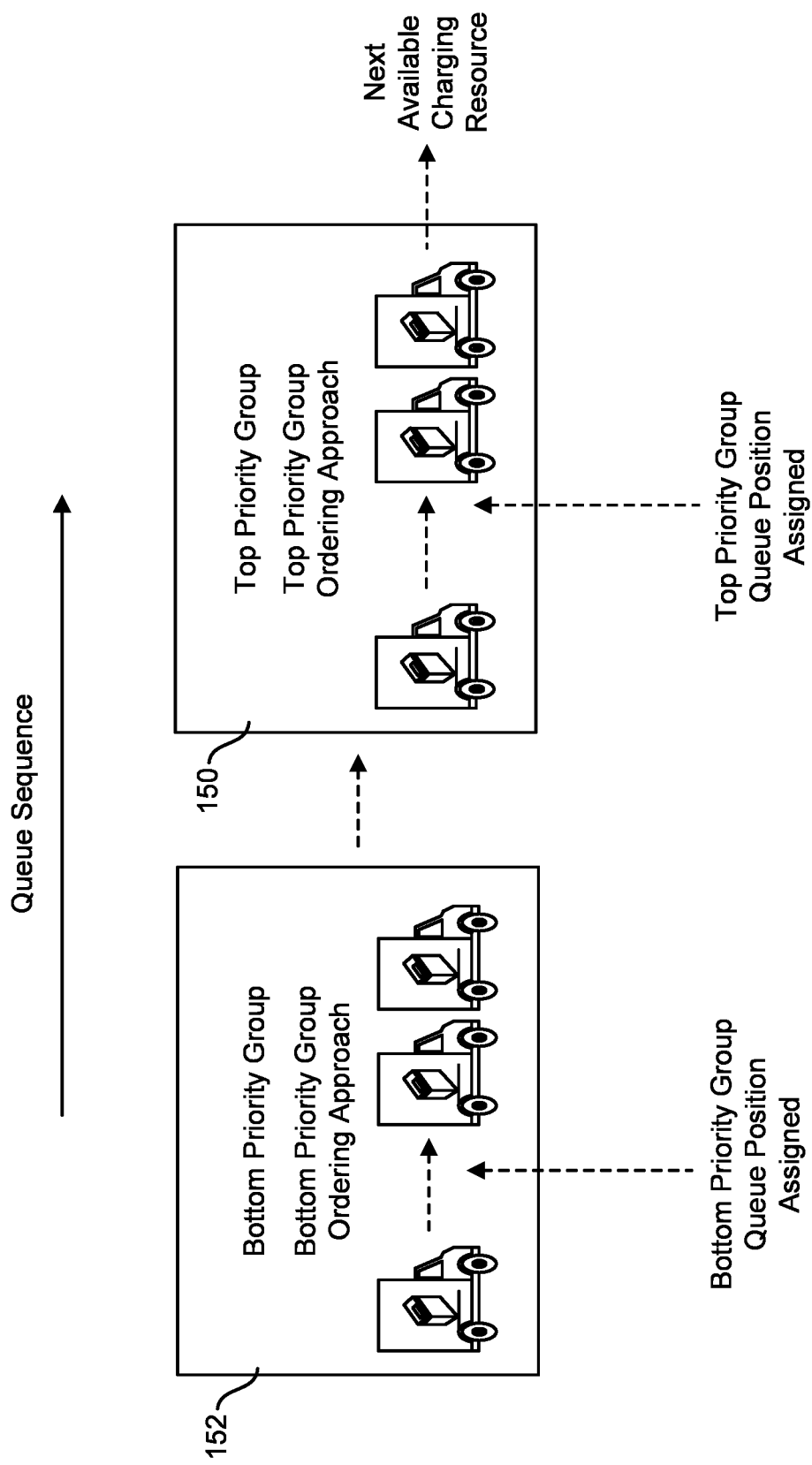
FIG. 9 is a diagrammatic illustration of an access queue for charging resources, in accordance with embodiments.

FIG. 8 is a diagrammatic illustration of a reorganization method 110B that can be performed by system 10 based on the reorganization variable VAR. FIG. 9 is a diagrammatic illustration of a multiple group access queue that may be established and maintained by the system 10 in connection with the reorganization method 110B in accordance with embodiments (e.g., at step 104 of FIG. 5A). As shown, the access queue includes a plurality of priority groups such as top priority group 150 and bottom priority group 152. Although two priority groups 150 and 152 are shown in FIG. 9, other embodiments include more than two priority groups. The multiple priority groups 150, 152 are each assigned a group sequence position. Similar to the access queue described in connection with FIG. 6, a first group priority position may be position at or near a "top" of the list or sequence (e.g., group 150), and a last group priority position may be a position at or near a "bottom" of the list or sequence. System 10 maintains an access queue including a sequence of positions within each of the priority groups such as 150, 152. When assigning queue positions (e.g., step 108) and/or reorganizing queue positions (e.g., step 110), the system 10 may assign vehicle a vehicle 12 a queue position in any of the priority groups such as 150, 152 based on any suitable criteria. In embodiments described below, for example, vehicles 12 that are determined to require assignment to an access queue may be initially assigned to a relatively low priority group such as the bottom priority group 152 if the system 10 determines that a charging resource 14 will be unable to fully recharge the associated battery 18 during the break time of the vehicle (e.g., VAR<1). In these and other embodiments, a vehicle 12 may be initially assigned to a relatively high priority group such as priority group 150 if the system 10 determines that a charging resource 14 may be able to fully recharge the associated battery 18 during the break time of the vehicle (e.g., VAR≥1). Geofencing of portions of a fleet of vehicles may support higher uptimes by providing vehicles operating in the associated region greater priority to obtain charge. This may also translate to managing when vehicles are assigned to go on break, and the length of the breaks.

A first priority access position for the vehicles 12 in the plurality of priority groups such as 150, 152 may be a position at or near the top of the list or sequence of the top priority group. Within each priority group such as 150, 152, the vehicles 12 may be assigned queue positions as described above in connection with step 108, and queue positions may be reorganized by any suitable methods such as those described above in connection with step 110. One or more of the priority groups such as 150, 152 may be maintained and/or reorganized by different approaches or methodologies. For example, in embodiments described below with reference to FIG. 8, access positions in the top priority group 150 are based on criteria including the associated variable VAR, and access positions in the bottom priority group 152 are based on a first in-first out access queue.

Referring back to FIG. 8, when assigning queue positions (e.g., step 108) and/or reorganizing queue positions (e.g., step 110), system 10 determines the variable VAR as shown by step 160. As shown by step 162, if the variable VAR is greater than or equal to a first predetermined level (e.g., 1) indicating that the break time of a vehicle 12 is sufficient to enable the associated battery 18 to be charged to a predetermined level such as a full SOC by a charging resource 14, the access position of the vehicle may remain unchanged as shown by step 164. For example, the vehicle 12 may be assigned or reassigned an access position in a relatively low priority group such as bottom priority group 152 (FIG. 9). The access position within the assigned priority group may for example be a position at the end of the access sequence. As shown by step 166, if the variable VAR is less than the first predetermined level (e.g., 1) and greater than a second predetermined level (e.g., 0.2) the vehicle 12 may be assigned or reassigned a priority position in a relatively low priority group such as the bottom priority group 152. In embodiments, system 10 may maintain the access queue sequence in the bottom or other relatively low priority group such as 152 based on a first come-first service guild line sequence. The access position within the assigned priority group may be a position following the first come first service guild line (e.g., FIFO) as shown by step 168. As shown by step 170, if the variable VAR is less than or equal to the second predetermined level (e.g., 0.2, representative of a need for a charging time period relatively longer than the break time of the vehicle 12), the system 10 may assign or reassign an access position in a relatively high priority group such as the top priority group 150. In embodiments, the system 10 may maintain the access queue sequence in the top or other relatively high priority group such as 150 in the sequence of the variable VAR of the associated vehicles 12, where the highest priority position (e.g., assigned to the vehicle entitled to be assigned to the next available charging resource) has the lowest variable VAR (i.e., is most in need of charging).

Other embodiments of system 10 use other methodologies to assign and reorganize the access queues. For example, embodiments of system 10 may assign initial access queue positions (e.g., step 108) or reorganize access queue positions (e.g., step 110) based on determinations of the amount of charge a vehicle 12 needs to complete its mission. By methodologies of these types the system 10 effectively looks ahead and predicts the additional amount of charge needed by a vehicle 12 to complete its mission. In embodiments, system 10 may, for example, determine the predicted additional charge (PAC) based on criteria including the current SOC, an expected amount of energy needed by the vehicle 12 over the period of its mission, and a remaining length of time in the mission of the vehicle. In connection with such a determination, the system 10 may monitor the length of time that a vehicle 12 has been performing its mission, and thereby determine the length of time remaining before the mission is complete (e.g., before the vehicle's shift is over). The system 10 may determine the predicted amount of charge (PAC) needed by the vehicle 12 to complete its mission by determining a ratio of the remaining mission time to the length of a full mission, and multiplying the ratio and the full mission energy needs. In embodiments, the PAC may include a buffer amount of charge be added to the initial determination of the PAC. The buffer can be a margin of charge that minimizes the likelihood of a complete discharge of the battery 18, such as for example if the vehicle 12 consumes more than a proportional amount of its energy or charge during the remaining portion of its mission, or the SOH is low. The amount of the buffer can, for example, be a predetermined amount of charge, or an amount determined based on the initial prediction of the additional charge needs (e.g., a percentage of the initial PAC). In embodiments, the system 10 assigns and/or reorganizes access queue positions by the methods described above using the variable VAR of Equation 1 in connection with FIGS. 8 and 9, with the PAC substituted for the battery size (e.g., a predetermined fixed SOC) in those other embodiments.

Similarly, in embodiments, system 10 uses the PAC as a variable in the cost functions used to determine when to discontinue access of a vehicle 12 to a charging resource 14. For example, the PAC determined by approaches such as those described above may be substituted for the full SOC, SOC operational threshold or other predetermined SOC thresholds in the methods described above in connection with FIGS. 5A and 5B. In embodiments, for example, the PAC may be substituted for the battery SOC operational threshold described in connection with step 120 in FIGS. 5A and 5B above. By methods of these types the batteries 18 of vehicles 12 may be recharged to levels that are sufficient to complete the vehicle's mission, while maximizing the availability of the charging resource 14 to other vehicles. Allocation of charging resources 14 of the system 10 are thereby optimized. In yet other embodiments, the PAC is used to determine whether a vehicle 12 should be assigned to an access queue (e.g., at step 106).

Intelligent battery charging methodologies of the types described herein may be deployed to reduce the battery size while minimizing the number of chargers. Vehicle uptime can be increased and total costs of an ecosystem optimized. Embodiments may be especially well suited for ecosystems where repetitive natures of missions may be exploited, along with information of the other mobile agents in the ecosystem, to determine the appropriate charging strategy. Using break times as opportunities for charging, the amount of energy required to be carried on board the vehicles may be substantially reduced. This in turn reduces the need of charging all the vehicles at the same time. Optimal charging strategies may be based on ecosystem requirements by optimizing the cost function based on factors such as charging rate, charging time and powertrain life. Smaller on board energy storage capabilities can be used without compromising mission requirements. Operators may be assigned to active vehicles to maintain work schedules. Mixed fleet operation (e.g., fleets with electric and diesel or other combustion engines) may be managed by assessing a collaborative cost function. For example, the cost function may be a function of operating expenses, emissions such as $CO_2$ impact, and mission downtime. For example, a diesel vehicle may be deemed necessary to bring into operation when the cost function shows that the optimum strategy is one with the inclusion of the diesel vehicle, rather than all electric vehicles. In summary, advantages of embodiments may include reduced battery size, increased payload capacity, shorter wait times, reduced downtime, smaller battery needs by each vehicle, and lower operating expenses (e.g., grid costs). The number of charging resources for an ecosystem can be optimized without impacting uptime and battery size.

It is to be understood that the above description is intended to be illustrative, and not restrictive. Many other embodiments will be apparent to those of skill in the art upon reading and understanding the above description. For example, it is contemplated that features described in association with one embodiment are optionally employed in addition or as an alternative to features described in or associated with another embodiment. The scope of the invention should, therefore, be determined with reference to the appended claims, along with the full scope of equivalents to which such claims are entitled.

What is claimed is:

1. A method for controlling access of a plurality of rechargeable devices to one or more charging resources, comprising:
    receiving equipment information for each device including a state-of-charge (SOC) and break time;
    receiving charger information including availability;
    assigning each device having the SOC less than a first level a queue position in an access queue of a charging resource;
    assigning a device access to a charging resource when the queue position of the device reaches a first priority position and a charging resource is available; and
    for each device assigned access to a charging resource, ending access to the charging resource when either a determined elapsed charging time period is equal to or greater than the break time or the SOC is greater than a second level.

2. The method of claim 1 wherein assigning a queue position includes initially assigning the piece of equipment a last priority position.

3. The method of claim 2 wherein updating the access queue includes updating the access queue on a first in-first out basis based on availability of the charging resource.

4. The method of claim 1 wherein updating the access queue includes updating the access queue on a first in-first out basis based on availability of the charging resource.

5. The method of claim 1 wherein:
    maintaining an access queue comprises maintaining an access queue including a plurality of priority groups; and
    assigning a queue position includes assigning a position in one of the plurality of priority groups based on the equipment information.

6. The method of claim 5 wherein at least some of the plurality of priority groups of the access queue includes a different sequence ordering approach.

7. The method of claim 6 wherein assigning a queue position includes assigning a position based on one or more of the SOC, break time, or charging rate of the charging resource.

8. The method of claim 5 and further comprising reordering the queue positions in each of the plurality of priority groups.

9. The method of claim 1 wherein:
receiving equipment information includes receiving a battery charging capability parameter; and
the method further includes:
determining, for each piece of equipment assigned access to a charging resource, if the battery is at a low charging capability state based on the battery charging capability parameter; and
generating, for each piece of equipment assigned access to a charging resource, an instruction to end access to the charging resource when the battery is determined to be at the low capability charging state and one or more other of the pieces of equipment include assigned access queue positions.

10. The method of claim 9 and further including assigning an access queue position to each piece of equipment for which an instruction to end access to the charging resource was generated when the battery is determined to be at the low capability charging state.

11. The method of claim 10 wherein assigning the access queue position includes assigning the piece of equipment a last priority position.

12. The method of claim 1 and further including reordering queue positions of the pieces of equipment in the access queue.

13. The method of claim 12 wherein reordering queue positions includes reordering the queue positions based on one or both of the vehicle information or the charging resource information.

14. The method of claim 13 wherein reordering queue positions includes reordering the queue positions based on one or more of SOC, break time, or charging rate of the charging resource.

15. The method of claim 1 wherein:
the method further comprises determining, for each piece of equipment assigned a charging resource, a predicted amount of charge for the piece of equipment to complete its mission; and
generating an instruction to end access to the charging resource when the SOC is greater than the second level includes generating the instruction to end the access to the charging resource when the SOC is greater than the predicted amount of charge.

16. The method of claim 15 wherein assigning the access queue position includes assigning the access queue position based on the predicted amount of charge.

17. The method of claim 1 wherein:
the method further comprises determining, for each piece of equipment assigned a charging resource, a predicted amount of charge for the piece of equipment to complete its mission; and
assigning the access queue position includes assigning the access queue position based on the predicted amount of charge.

18. The method of claim 1 wherein assigning a piece of equipment access to a charging resource includes assigning the piece of equipment to a charging resource based on one or more of the vehicle information and the charging resource information.

19. The method of claim 18 wherein assigning the piece of equipment access to a charging resource includes assigning the piece of equipment to a charging resource based on the SOC of the piece of equipment and charging rate of the charging resource.

20. The method of claim 1 in a closed vehicle and charging resource ecosystem.

* * * * *